UNITED STATES PATENT OFFICE.

PAUL GONDOLO, OF PARIS, FRANCE.

TANNIN EXTRACT.

SPECIFICATION forming part of Letters Patent No. 231,035, dated August 10, 1880.

Application filed May 16, 1879. Patented in France March 12, 1879.

*To all whom it may concern:*

Be it known that I, P. GONDOLO, of Paris, in the Republic of France, have invented a new Mode of Manufacturing Tannin Extracts, of which the following is a specification.

The object of my invention is to provide a new method of manufacturing tannin extracts, by means of which the same will be obtained in a superior and clear condition.

Heretofore the vegetable matter from which tannin was extracted was macerated either with cold or hot water, but generally the latter.

In carrying out my invention the matter is also macerated, but before being used the water is acidified by means of an acid, but not to such an extent as to destroy the physical or chemical condition of the tannin. Sulphuric acid is preferable, as with it the best results have been obtained. The quantity varies to a certain degree, according to the greater or less quantity of lime that the river or well water employed in the maceration may contain. About six decigrams of acid for one liter of water generally produces the desired result. The decoction thus obtained is afterward treated with an alkali, but only in such quantities sufficient to neutralize the action of the superfluous acid. Either a caustic alkali, a carbonate, or some alkaline earth may be used. For instance, if the above-named quantity of acid is used, about one gram of carbonate of soda for each liter of the decoction will give a good result. If a very large quantity of acid has been used in the first operation, a proportionate quantity of alkali will be required to neutralize it. The decoction then passes through a third operation, which clarifies it. For this purpose blood is added to the solution; but before adding it the temperature of the decoction is cooled down to a point below that which coagulates the blood, so that the latter may spread through and pervade the whole solution, to prevent coagulating in a lump. The temperature is then raised above the coagulating-point of the blood, and the coloring-matter and salts are caught and held by said coagulant. The decoction is then left undisturbed for about an hour, is then drawn off and filtered, and then concentrated in the open air or in a vacuum from 3° to 45° Baumé.

The tannin extract obtained by this process is very rich in tannin, is very soluble, and is of a honey-yellow color. The tannin extract that is generally produced has a deep chestnut-brown color, which prevents the same from being in general use in tanneries.

My process can be applied for the extraction of tannin from wood, roots, leaves, bark, husks, grain, fruit, or from all vegetable matter containing the same.

I am aware of the Dize process of producing tannin by precipitating it out of concentrated solutions by means of concentrated sulphuric or hydrochloric acid, and I do not claim this, the acid in my case being only used in such small proportions as not to precipitate the tannin nor to affect its physical or chemical character.

I am also aware that gelatinous substances have been used for clarifying tannin-juices, as described in the patent to Bossiere, September 1, 1868.

Having thus described my invention, I claim as new and desire to secure by Letters Patent—

The process herein described of manufacturing tannin extracts, which consists in the following consecutive steps: first, macerating the crude material containing the tannin in slightly-acidulated water; secondly, neutralizing the free acid by an alkali or its equivalent, as described; thirdly, clarifying the solution by the introduction of blood, and then raising the temperature to the coagulating-point of the blood, and finally separating from the tannin-liquor the coagulated blood, with the salts and coloring-matter, by filtration, as set forth.

P. GONDOLO.

Witnesses:
 EDM. SORDER,
 A. E. TAVERNIER.